United States Patent
Visser

(10) Patent No.: US 8,359,787 B2
(45) Date of Patent: Jan. 29, 2013

(54) DEVICE FOR BUFFERING CONTAINERS WITH PLANTS AND DISTRIBUTING MEANS THEREIN OR THEREFOR

(75) Inventor: Anthony Visser, 's-Gravendeel (NL)

(73) Assignee: Visser 'S-Gravendeel Holding B.V., 'S-Gravendeel (NL)

(*) Notice: Subject to any disclaimer, the term of this patent is extended or adjusted under 35 U.S.C. 154(b) by 0 days.

(21) Appl. No.: 13/306,770

(22) Filed: Nov. 29, 2011

(65) Prior Publication Data

US 2012/0070261 A1 Mar. 22, 2012

Related U.S. Application Data

(63) Continuation of application No. 12/303,032, filed as application No. PCT/NL2007/000133 on May 24, 2007.

(30) Foreign Application Priority Data

Jun. 2, 2006 (NL) .................................. 1031944

(51) Int. Cl.
*A01G 9/00* (2006.01)

(52) U.S. Cl. .......................................... 47/18; 47/1.01 P

(58) Field of Classification Search .......... 47/18, 1.01 P, 47/66.7, 901, 1.01 R, 39, 48.5, 62 R, 62 C, 47/63, 65, 67, 82, 83; 414/623, 626; 294/87.22, 294/87.24

See application file for complete search history.

(56) References Cited

U.S. PATENT DOCUMENTS

| | | | |
|---|---|---|---|
| 6,135,704 A * | 10/2000 | Seaberg | 414/791.6 |
| 6,185,866 B1 * | 2/2001 | Enfaradi | 47/79 |
| 7,506,472 B2 | 3/2009 | Leyns et al. | |
| 2004/0068930 A1 | 4/2004 | Craig et al. | |

FOREIGN PATENT DOCUMENTS

WO 2005084417 A1 9/2005

* cited by examiner

*Primary Examiner* — Robert P. Swiatek
*Assistant Examiner* — Lisa Tsang
(74) *Attorney, Agent, or Firm* — Morgan Lewis & Bockius LLP; Richard F. Trecartin; Victor E. Johnson

(57) ABSTRACT

A buffering device for temporarily storing containers with plants in a buffer space includes a supply device for supplying containers, a disposer for disposing a number of supplied containers in a row extending in a first direction, a distributor provided with at least one controllable gripper for gripping a row of containers, wherein the distributor is movable substantially in a second direction which differs from the first direction, and is movable above the disposer. In turn the gripper includes opposing pivot arms arranged opposite to one another relative to an intended row of containers to be gripped, and further includes a pivot driver.

13 Claims, 3 Drawing Sheets

DEVICE FOR BUFFERING CONTAINERS WITH PLANTS AND DISTRIBUTING MEANS THEREIN OR THEREFOR

This application is a Continuation of U.S. patent application Ser. No. 12/303,032 filed Dec. 1, 2008 entitled METHOD AND DEVICE FOR BUFFERING CONTAINERS WITH PLANTS and published as U.S. Patent Application Publication No. US 2009-0196725 A1, which is a National Stage of International Patent Application No. PCT/NL2007/000133 filed May 24, 2007 entitled METHOD AND DEVICE FOR BUFFERING CONTAINERS WITH PLANTS and published as International Publication No. WO 2007/142513, which claims priority to Netherlands Patent Application No. 1031944 filed Jun. 2, 2006, the entire contents of which applications is incorporated herein for all purposes by this reference.

BACKGROUND OF INVENTION

1. Field of Invention

The invention relates to a buffering device for buffering containers with plants and in the system or on its own a distributing means or distributor at least evidently intended for use in conjunction with or simply in the buffering system.

2. Description of Related Art

It is known to cultivate plants in containers such as trays or pots. The containers can be temporarily stored by buffering thereof.

An object of the invention of the co-pending parent patent application with publication number EP 2 023 710 from which the present application is a divisional, is to provide a method and device for buffering containers, wherein the costs of buffering are reduced considerably while ease of use remains the same or is increased compared to the prior art. The present invention relates to the distributing means or distributor in or for such a buffering system.

Such a buffering system is generally known from WO 2005/084417, in which a fork-like gripping means is employed.

BRIEF SUMMARY

One aspect of the present invention is directed to a buffering system for temporarily storing containers with plants in a buffer space, the containers including a top edge. The buffering system may include a supply device for supplying the containers, a disposer for disposing a number of the supplied containers in a row extending in a first direction, and/or a distributor for distributing the containers. The distributor may be provided with at least one controllable gripper for gripping a row of the containers. The gripper may include opposing pivot arms arranged opposite to one another relative to an intended row of the containers to be gripped, and may further include a pivot driver for pivoting the pivot arms. The arms may include pivotal angled hooking elements, which may be arranged to engage the containers under the top edge thereof when driven by the pivot driver towards the containers.

The pivot arms may each be pivotally connected to a housing.

The buffering system may further include a displacement driver for controlling displacement of the gripper.

The pivot driver may be remotely controlled.

The distributor may be movable substantially in a second direction which differs from the first direction, and may be movable above the disposer.

The distributor may include a guide.

The guide may extend in a second direction to guide the gripper in a second direction.

The buffering device may further include a discharger for discharging the containers, wherein the distributor may be movable above the disposer, above the discharger and through the buffer space.

The distributor may be adapted to place containers in rows extending substantially in the first direction.

The gripper may include a water collecting element.

The water collecting element may include a third pivot arm.

The water collecting element may include an arcuate part.

Another aspect of the present invention is directed to a buffering system for temporarily storing containers with plants in a buffer space, the containers including a top edge. The buffering system may include a supply device for supplying the containers, a disposer for disposing a number of the supplied containers in a row extending in a first direction, and/or a distributor for distributing the containers. The distributor may be provided with at least one controllable gripper for gripping a row of the containers. The gripper may include at least two clamping sheets for gripping on or under the top edge of the containers.

Although the invention will be described on the basis of embodiments as shown in the accompanying drawings, it will be apparent to the skilled person that the invention is not limited to the shown examples. The invention is limited solely by the appended claims. It will also be apparent to the skilled person that it is possible to file divisional applications for components referred to in the description, irrespective of whether or not advantages of the features are stated. It will also be apparent to the skilled person that various combinations of the different measures of the device according to the invention stated in the description are possible, and that the skilled person can combine these measures in different advantageous ways, even to form devices of which the advantages are here indicated indirectly or directly in the description.

BRIEF DESCRIPTION OF THE DRAWINGS

The invention will be further described on the basis of the exemplary embodiments which are shown in the accompanying drawings, in which.

DETAILED DESCRIPTION

Figure 1:
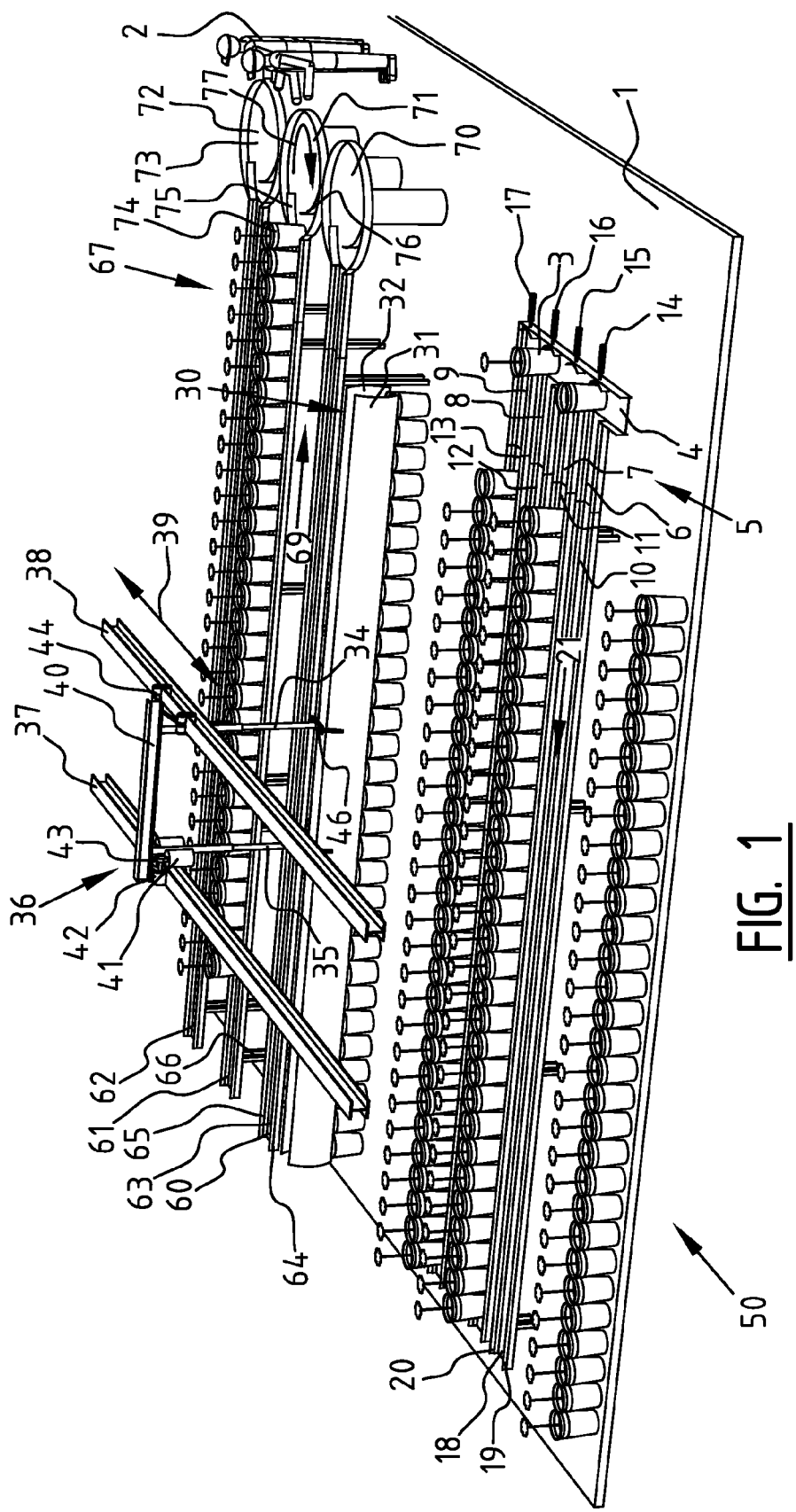
FIG. 1 shows a perspective view of a buffering device according to a first embodiment.
Figure 2:
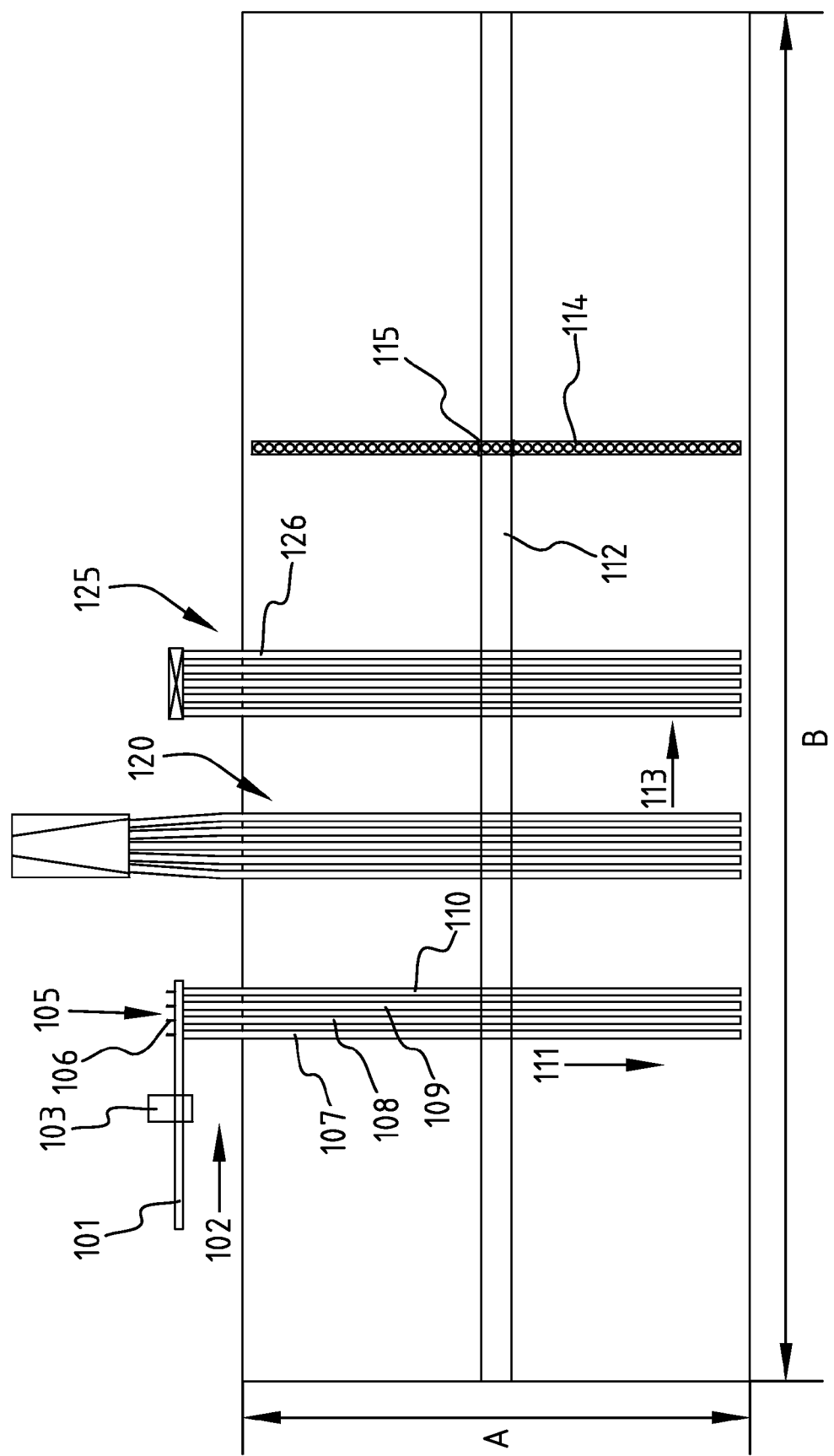
FIG. 2 shows a top view of a second embodiment of a buffering device.

FIG. 1 shows a view of a part of a space in a greenhouse. A greenhouse has a number of roof spans, such as a greenhouse of the known Venlo-type. In FIG. 2, "A" indicates the width of a roof span in an embodiment of 12.8 metres. The roof span also has a determined length. This length depends on the greenhouse. In one embodiment the length can be over 50 metres. It is possible to use the buffering device in a greenhouse wherein practically the whole floor surface under a roof span is used as buffer space for the buffering device and as buffer surface. In another embodiment a plurality of roof spans is used and/or a part of a roof span is used. In the embodiment shown in FIG. 2 the space of a roof span is used partly for the supply and discharge of containers and for buffering the containers. Sorting devices and other devices are additionally placed under an adjacent roof span part.

The greenhouse has a floor 1. Apparatuses can be placed and/or employees 2 can be active and/or pots can be placed on floor 1.

In the shown embodiment containers 3 are supplied on a conveyor belt 4 of a supply device 5. The supply device is adapted as sorting means. The supply device comprises four sorting channels 6-9. A supplied container 3 is classified and, depending on the classification, discharged via one of the sorting channels 6-9 to the respective disposing means or disposers 10-13 situated downstream of the respective sorting channels 6-9.

Pots/plants of a determined preset quality are pushed into the first sorting channel with a pusher 14 and fed to the first disposing means or disposer 10. The pusher is connected to a control. The pusher is a pushing-over device. On the supply device can for instance be arranged a detecting means, such as a camera, which performs a determined measurement and makes a comparison with a parameter stored in a memory. On the basis of the comparison the control can switch on the pusher and push the pot/plant into the respective sorting channel.

In another embodiment containers 3, such as pots provided with a plant, are placed on the supply device by the operative. The operative can here perform a determined sorting. Pots/plants of a determined quality can be placed on the first sorting channel 6, pots/plants of a second quality on second sorting channel 7, and so on.

Disposing means or disposers 10-13 form a guide and comprise a transport means, embodied in known manner by a belt 18 tensioned between two rollers, and upright wall parts 19,20 which form a gutter. Pot 3 stands on the belt and is guided by the wall parts. When driven in the usual manner, the conveyor belt will transport the pot in a first direction as according to arrow 21.

When a container is supplied via the sorting channel, disposing means or disposers 10-13 are adapted to move this container as far as possible in the direction of arrow 21, until it collides with the container already in position. Despite the movement of the conveyor belt, the containers already in position will not change position. The conveyor belt and the container slip, wherein the container retains the position it occupies. In another embodiment the container is lifted off the conveyor belt once the container has reached the disposed position.

A container which is being guided on an empty gutter of a disposing means or disposer 10 is moved to the end of the gutter and then runs up against a protrusion or other stop means.

In the embodiment shown in FIG. 1 disposing means or disposer 11 and disposing means or disposer 13 are almost completely filled with a row of containers extending in first direction 21. Although the shown embodiment shows a straight row, this is not essential to the invention and the first direction 21 can for instance be curved.

The row of containers disposed according to the invention can be gripped with a gripping means or gripper 30 which is formed by two clamping sheets 31, 32. Sheets 31, 32 can for instance grip on or under the rim of the pot. FIG. 1 shows a gripped row of containers which are clamped and gripped by gripping means or gripper 30.

Gripping means or gripper 30 is connected via a number of controllable cylinders 34, 35 to distributing means or distributor 36, which in this embodiment comprises two profile parts 37, 38 embodied as a rail, wherein this rail extends in a second direction 32, in the shown embodiment transversely of first direction 21. Rails 37, 38 are adapted to guide a carriage 40 on which cylinders 34,35 are mounted. Carriage 40 also comprises a drive means or driver 41 which is connected to a number of rollers 42, 43 in order to move carriage 40 over rails 37,38 as according to arrow 39. Carriage 40 further comprises bearing-mounted wheels 44.

When the disposed row of containers is gripped by gripping means or gripper 30, these containers can be displaced in the second direction 39. In the shown embodiment the row of containers is herein lifted out of the disposing means or disposer by clamping in that sheets 31 and 32 can be moved toward each other by means of a controllable cylinder 46. Through lifting thereof, the containers can be placed in another part of the space.

According to the invention the lifting and displacing comprises of displacing the row of containers in a second direction 39 and placing the row in the buffer space with a distributing means or distributor as described in more detail herein below. In the shown embodiment such a row is placed on floor 1. A considerable saving is hereby made, since there are no special measures for buffering the row of containers other than distributing means or distributor 36. There is no separate conveyor belt from the disposing means or disposer to the position where the containers are buffered. The containers are also placed on floor 1 without a particular support being necessary for this purpose. Floor 1 is immediately suitable for placing of the containers.

When a row is buffered, a number of parameters relating to the buffered row is stored in a memory of a control means. One parameter can be the buffering location. In the shown embodiment this parameter can be indicated with a distance in the second direction. The sorting criteria can also be stored. A possible parameter is the moment of buffering. This for instance enables a periodic treatment of the buffered plants, as will be described hereinbelow. Yet another parameter can be the size of the containers or the number of containers. The data are stored in a memory. The memory can be coupled to a network via a server. It is hereby possible to monitor the buffered plants/pots/trays remotely. A better control of the buffering hereby becomes possible. A seller can request what is currently in stock. In an embodiment it is possible to place an order via the interface, whereby the buffering device receives an instruction remotely, whereby the requested buffered containers are retrieved in order to be removed.

Because a row of containers is disposed and gripped, it is possible to suffice with the use of distributing means or distributor. This distributing means or distributor in turn replaces the solutions known in the prior art for transporting the containers to a suitable location for buffering.

FIG. 1 shows a row 50 of containers which are placed on floor 1. Row 50 extends in the first direction 21 and is displaced a distance in the direction of second arrow 39 relative to disposing means or disposers 10-13.

A number of rows of containers can be buffered parallel to each other in the buffer space, which is formed in the shown embodiment by floor 1 which extends in the first direction and in the second direction. A number of rows can be placed parallel to each other on the floor. They extend in particular parallel to the first direction 21.

In an embodiment the containers can be set down in offset manner, whereby a further concentration of the buffered containers takes place.

When containers with a diameter of 8 cm are for instance placed on floor 1, containers can be placed every 9 cm in rows on floor 1 as shown in FIG. 1. An intermediate space of 1 cm is hereby present in each case between the disposed and buffered containers, whereby sheets 31 and 32 can engage under the rim of the pot.

The buffering device according to FIG. 1 is provided with a control which can actuate the controllable elements such as the pushers, the disposing means or disposers, conveyor belts and distributing means or distributor 36. The diverse drivable elements can be provided with a radio receiver, whereby the control can feed the instructions in wireless manner to the respective elements.

In an embodiment the control is provided with an input means with which an operative 2 can indicate that a determined buffered type of container/plant can be removed from the buffering and further processed. After these instructions the distributing means or distributor will collect the row. The position of the row of containers 50 placed on floor 1 is stored in a memory of the control. When the relevant row is requested, distributing means or distributor 36 moves to the disposed row 50 as according to arrow 39 and will grip this row by means of clamping.

When the desired row has been collected with the distributing means or distributor, the distributing means or distributor moves over rails 37, 38 toward discharge means or dischargers 60-62. These latter are formed by a conveyor belt 63 and upright wall parts 64, 65. They are placed on a frame 66. In FIG. 1, a row 67 has just been placed on discharge means or discharger 61. Discharge means or dischargers 60-62 form a guide which in this shown embodiment extends parallel to the first direction 21. No rotation and the like of the distributing means or distributor is hereby necessary.

The control guides distributing means or distributor 36 to a position above respective discharge means or dischargers 60-62 and places the pots on the conveyor belt, between wall parts 64, 65. The distributing means or distributor then moves away again.

Row 67 is discharged as according to arrow 69 in the direction of one of the three buffering discs 70-72. The buffering disc comprises a top 73 which can rotate. A container 74 is guided between arms 75, 76 and will be supported by top 73, and herein rotate as according to arrow 77. Operative 2 can remove from the table and further process the containers 74 discharged from the buffering device. In another embodiment discharge means or dischargers 60-62 can be coupled to an automatic processing. A further processing can for instance be formed by a packaging unit or the like.

The further treatment/processing of the pots does not form part of the present invention.

FIG. 2 shows a second embodiment. A feed belt 101 carries containers to a detecting means 103 as according to arrow 102. One or more parameters of the containers are here detected. Detecting means 103 forms part of a sorting device. Here a parameter can be detected and compared to a predetermined value stored in a memory of the control means.

Conveyor belt 101 carries the containers further to the sorting device/supply device 105. This is comparable to the first embodiment formed by means of pushers 106. The containers can be placed by the pushers on one of four guides 107-110, which are embodied in like manner to those of the first embodiment. Guides 107-110 form disposing means or disposers for disposing of the containers in a row, wherein the row extends in a first direction 111. A guide 112, mounted above disposing means or disposers 107-110, for instance on a ceiling of a greenhouse, extends in the second direction 113, which in the shown embodiment is at right angles to the first direction 111. Suspended movably from guide 112 is a distributing means or distributor 115, which comprises a gripping means or gripper 114 for gripping a disposed row of containers from disposing means or disposers 107-110.

The buffering device according to the invention can be placed in a greenhouse. A greenhouse has roof spans, which have for instance a width A as shown in FIG. 2. The roof span has for instance a length B as shown in FIG. 2. The buffering device is placed for the greater part under one of the roof spans of the greenhouse, indicated with A×B. Distributing means or distributor 115 can be displaced over the whole width along guide 112. A gripped row of pots can thus be lifted from disposing means or disposer 107 and placed at another location, preferably in a parallel row in the buffer space which has a surface area of A×B.

The position of the placed buffer is stored in a memory. The buffers can be placed in a number of rows. The rows can be placed at regular distances from each other. A high density of buffered pots can hereby be achieved in the buffer space.

In the shown embodiment the device also comprises a discharge device 120 which is formed by a number of guides which extend parallel to each other and which can for instance be embodied as in FIG. 1, or be provided in another manner with means for discharging a row of pots.

A further treatment device 125 can be present in addition to the buffering device. This device can also be placed partially in the A×B space of the roof span. This device also consists of a number of parallel guides or gutters in which containers can be placed. It is for instance embodied as a water tank. At fixed times the buffered plants/pots can be lifted and placed by distributing means or distributor 115 onto a gutter 126 of treatment means 125. The pots can here for instance be placed in water.

In a preferred embodiment the gripping means or gripper 114 of distributing means 115 is embodied so as to place the plants on gutter 126. The gripping means or gripper is particularly embodied here to collect water in which the row of plants is immersed, so that the row of plants does not drip onto plants buffered in the buffer space when the gripped row moves back to the original position or to a new position over those plants in the buffer space. Then stored in the memory here is that the plants are provided with water at a determined moment, and a new position of the plants with the properties detected in detecting device 103 is then linked to the new position.

Figure 3:
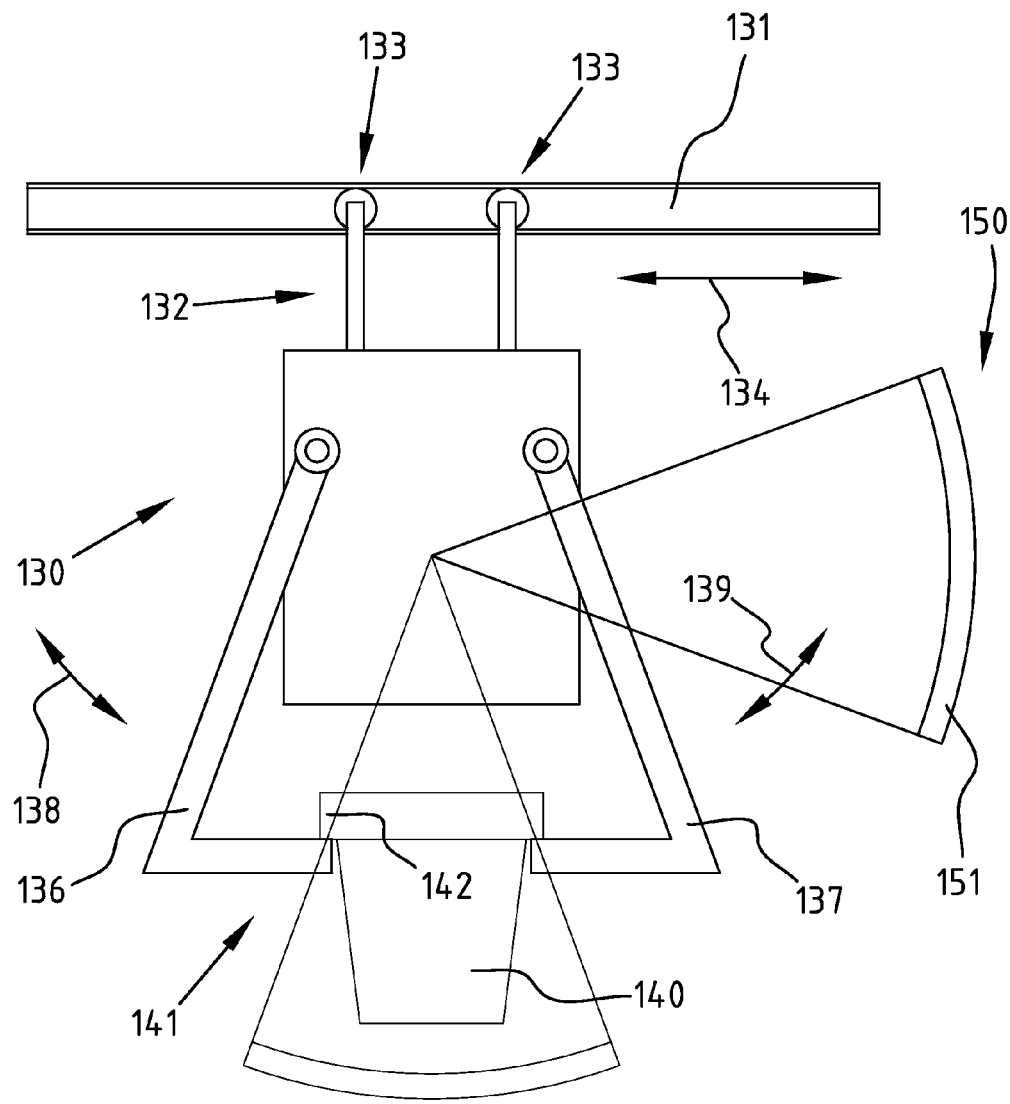
FIG. 3 shows a detail of a gripping means or gripper as according to an arrow I in FIG. 1 according to a second embodiment, in detail exhibiting an embodiment of the present invention.

FIG. 3 shows details of an embodiment according to the present invention of gripping means or gripper 130. A cross-section is shown here. Gripping means or gripper 130 is suspended below a rail 131 extending substantially in a horizontal plane. A trolley 132 connects gripping means or gripper 130 to rail 131. The trolley comprises a number of wheels 133 which are received in the rail. The rail can have an extruded profile in which the wheels engage. A drive means or driver is connected to the wheels and can displace trolley 132 in the second direction as according to arrow 134. The gripping means or gripper herein moves over the buffered trays or pots.

Gripping means or gripper 130 according to this second embodiment comprises a housing 135 to which two arms 136,137 are pivotally connected, which can pivot as according to arrows 138, 139. In the shown position a pot 140 can be gripped and clamped between arms 136,137 between the outer ends provided with hooking elements. In this embodiment the hooking elements 141 grip under an edge 142 of the pot. The arms are connected to body 135 with a hinge. A drive means or driver can cause the two arms 136,137 to pivot around the hinge. The drive means or driver can be controlled remotely.

Gripping means or gripper 130 according to this second embodiment is also provided with a larger third arm 150. This is embodied as water or drop-collecting element. In the shown position arm 150 has been moved to a position in which pot 140 can be gripped by arms 136, 137. Once the pot has been gripped and lifted in that the distance between housing 135 and rail 131 is reduced by means of a suitable drive means or driver such as a cylinder, the third arm can be pivoted around hinge 152 as according to arrow 139, wherein the arcuate part 151 of the third arm is positioned under the gripped container, as shown with broken lines. Drops of water possibly formed on the container will now be collected in arcuate form 151 and will not drop onto plants over which gripping means or gripper 130 is moved during buffering. This results in less damage. The skilled person will be familiar with possible measures whereby water collected in arcuate part 151 can be drained at the moment containers are being placed on a surface again, when the third arm must be pivoted back to the position shown in FIG. 3. A further draining means can be arranged on arcuate part 151.

It will be apparent to the skilled person that different variations are possible within the concept of this invention. The invention is therefore not limited to the shown embodiments. Various components referred to in the description can be identified as possible basis for divisional applications.

What is claimed is:

1. A buffering system for temporarily storing containers with plants in a buffer space, the containers including a top edge, the buffering system comprising:
    a supply device for supplying the containers;
    a disposer for disposing a number of the supplied containers in rows extending in a first direction substantially parallel to a longitudinal axis of a conveyor; and
    a distributor for distributing the containers, the distributor provided with at least one controllable gripper for simultaneously gripping a plurality of containers in a row of the containers;
    wherein the gripper includes opposing pivot arms arranged opposite to one another relative to the plurality of containers in the row of the containers to be gripped, rotating around an axis that is above and substantially parallel to the longitudinal axis of the conveyor and the row of the containers to be gripped, and pivoting relative to one another in substantially opposite directions in use, and the gripper further including a pivot driver for pivoting the pivot arms,
    wherein the pivot arms include pivotal angled hooking elements, which are arranged to engage the plurality of containers in the row of the containers under the top edge thereof between the pivotal angled hooking elements when driven by the pivot driver towards the containers.

2. The buffering system according to claim 1, wherein the pivot arms are each pivotally connected to a housing.

3. The buffering system according to claim 1, further comprising a displacement driver for controlling displacement of the gripper.

4. The buffering system according to claim 1, wherein the pivot driver is remotely controlled.

5. The buffering system according to claim 1, wherein the distributor is movable substantially in a second direction which differs from the first direction, and is movable above the disposer.

6. The buffering system according to claim 1, wherein the distributor comprises a guide.

7. The buffering system according to claim 6, with the guide extending in a second direction to guide the gripper in a second direction.

8. The buffering system according to claim 1, wherein the buffering device further comprises a discharger for discharging the containers, wherein the distributor is movable above the disposer, above the discharger and through the buffer space.

9. The buffering system according to claim 5, wherein the distributor is adapted to place containers in rows extending substantially in the first direction.

10. The buffering system according to claim 1, wherein the gripper comprises a water collecting element.

11. The buffering system according to claim 10, wherein the water collecting element comprises a pivotable third arm.

12. The buffering system according to claim 11, wherein the water collecting element comprises an arcuate part.

13. A buffering system for temporarily storing containers with plants in a buffer space, the containers including a top edge, the buffering system comprising:
    a supply device for supplying the containers;
    a disposer for disposing a number of the supplied containers in a row extending in a first direction substantially parallel to a longitudinal axis of a conveyor; and
    a distributor for distributing the containers, the distributor provided with at least one controllable gripper for gripping a plurality of containers in a row of the containers;
    wherein the gripper includes at least two clamping sheets for gripping on or under the top edge of the plurality of containers in the row of the containers, each clamping sheet extending substantially parallel to the longitudinal axis of the conveyor.

* * * * *